Dec. 29, 1925.  
L. R. McDONALD  
DISPLAY APPARATUS  
Filed Nov. 8, 1924

1,567,281

5 Sheets-Sheet 1

Inventor,
Leslie R. McDonald.
By his Attorney
Andrew Wilson.

Dec. 29, 1925.
L. R. McDONALD
1,567,281
DISPLAY APPARATUS
Filed Nov. 8, 1924
5 Sheets-Sheet 2
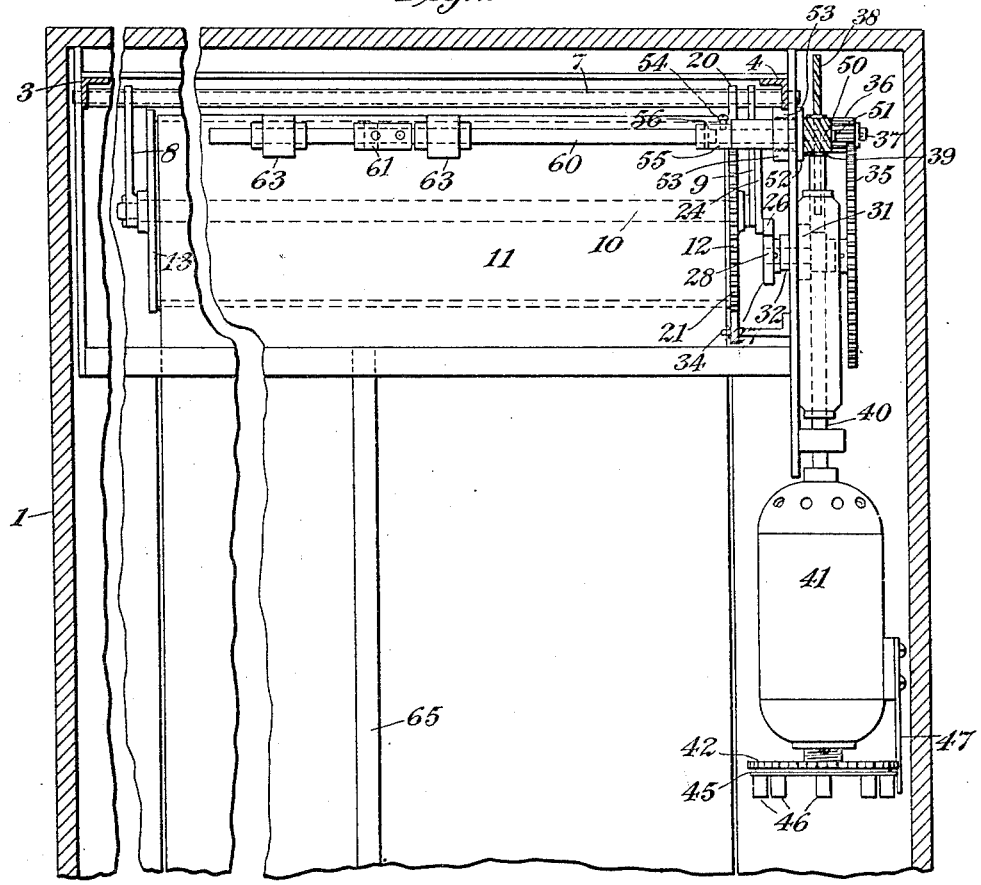
Fig. 2
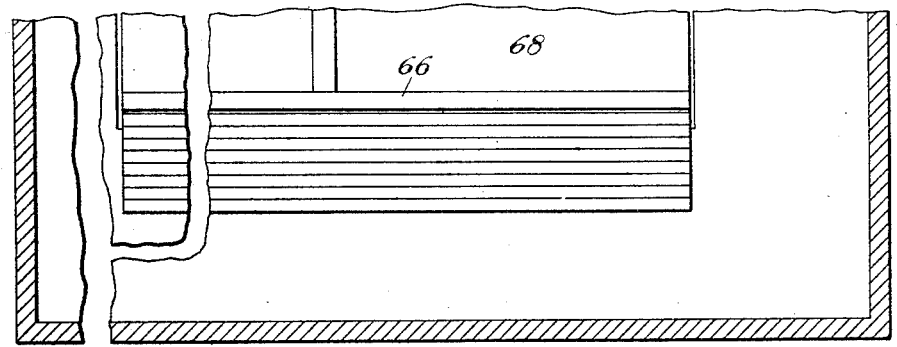
Fig. 5
Inventor,
Leslie R. McDonald.
By his Attorney
Andrew Wilson.

Dec. 29, 1925.
L. R. McDONALD
DISPLAY APPARATUS
Filed Nov. 8, 1924
1,567,281
5 Sheets-Sheet 3
*Fig. 3*
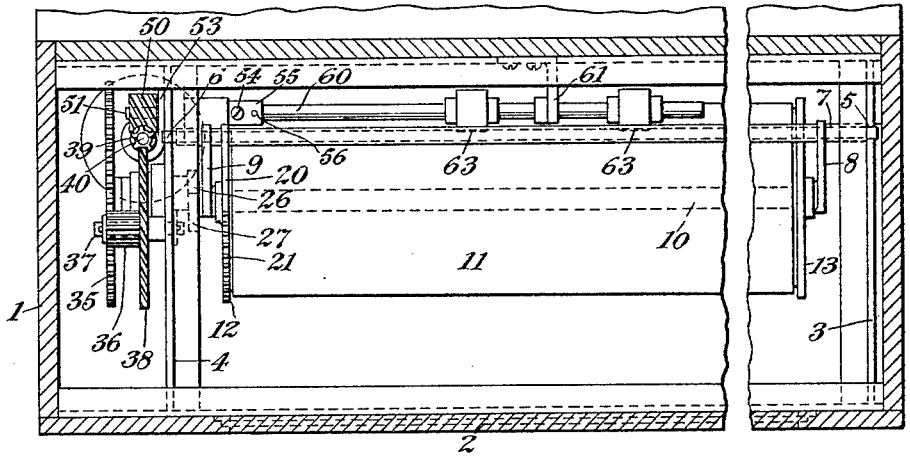
*Fig. 10*
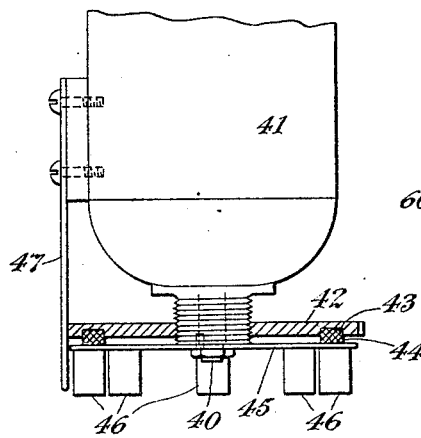
*Fig. 12*
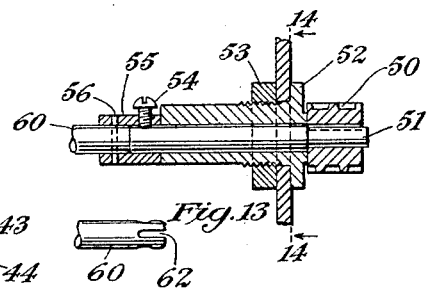
*Fig. 13*
*Fig. 11*
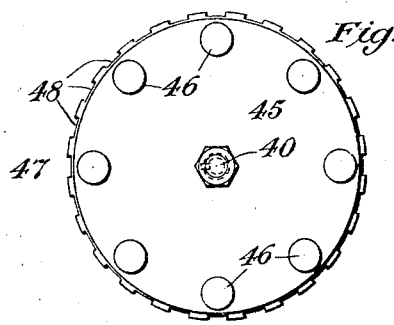
*Fig. 14*
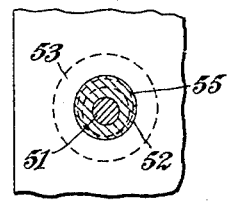
Inventor.
Leslie R. McDonald.
By his Attorney
Andrew Wilson.

Dec. 29, 1925.  
L. R. McDONALD  
DISPLAY APPARATUS  
Filed Nov. 8, 1924

1,567,281

5 Sheets-Sheet 4

Inventor,
Leslie R. McDonald.
By his Attorney
Andrew Wilson.

Dec. 29, 1925.

L. R. McDONALD

DISPLAY APPARATUS

Filed Nov. 8, 1924     5 Sheets-Sheet 5

Inventor,
Leslie R. McDonald.
By his Attorney
Andrew Wilson.

Patented Dec. 29, 1925.

1,567,281

UNITED STATES PATENT OFFICE.

LESLIE R. McDONALD, OF MONTREAL, QUEBEC, CANADA.

DISPLAY APPARATUS.

Application filed November 8, 1924. Serial No. 748,537.

*To all whom it may concern:*

Be it known that I, LESLIE R. MCDONALD, a citizen of the United States, residing at Montreal, Quebec, Canada, have invented certain new and useful Improvements in Display Apparatuses, of which the following is a specification.

My invention relates to that class of display apparatus wherein flexible placards are wound around a rotatable holder and are released and allowed to unroll, one by one, and successively drop into view position, particularly to that class of such apparatuses wherein placards of substantially greater length than the circumference of the rotatable holder are used, and are permitted to unroll and drop forward and down, successively, as the carrier revolves; my improvement being particularly directed to the means whereby each placard is raised and positively pushed forward over the carrier, until it will unroll of its own weight and fall forward into proper view position. Other objects of my invention are to simplify the placard-carrying and rotating mechanism; to make the placard carrier readily insertable in and removable from its carrying frame; and to improve the details of the mechanism employed, all as will be hereinafter pointed out and explained.

Figure 1:
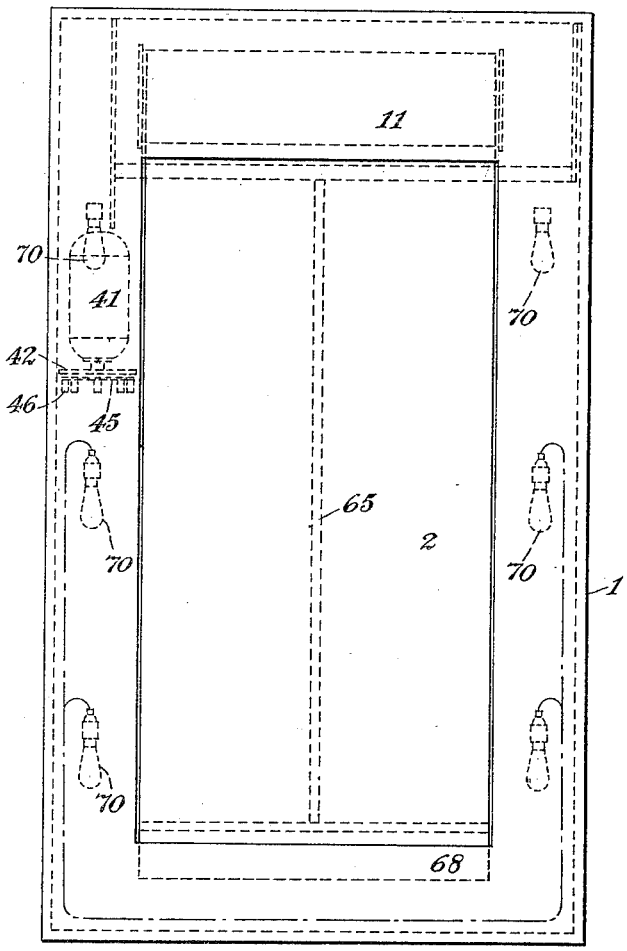
Figure 4:
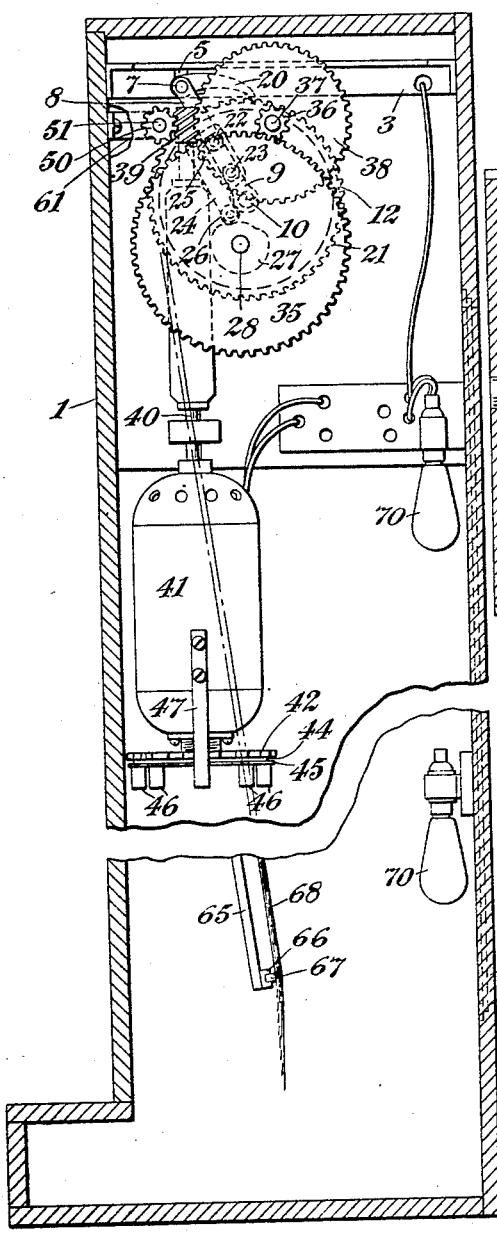
Figure 7:
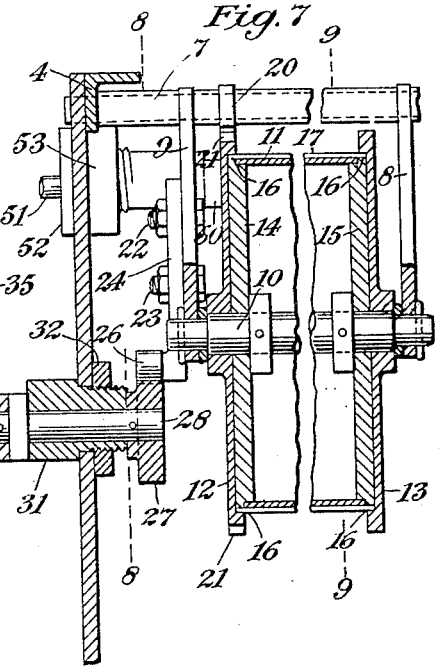
Figure 6:
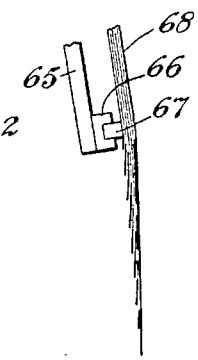
Figure 8:
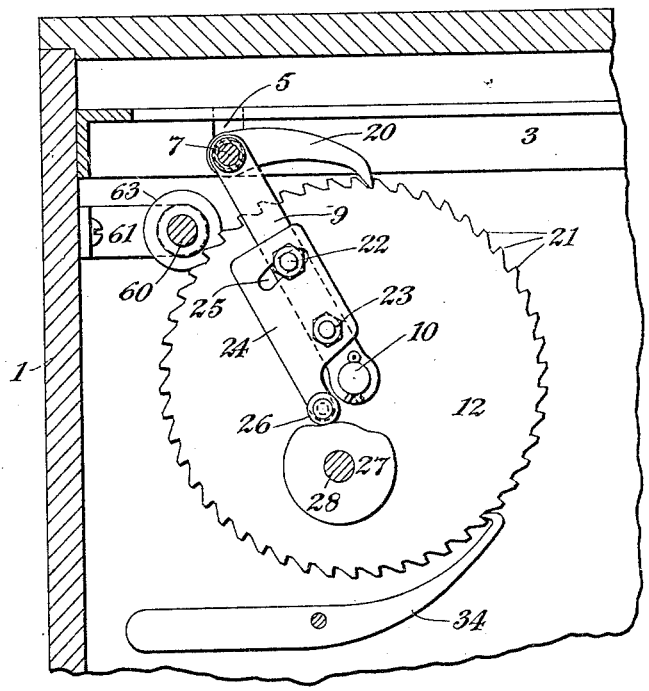
Figure 9:
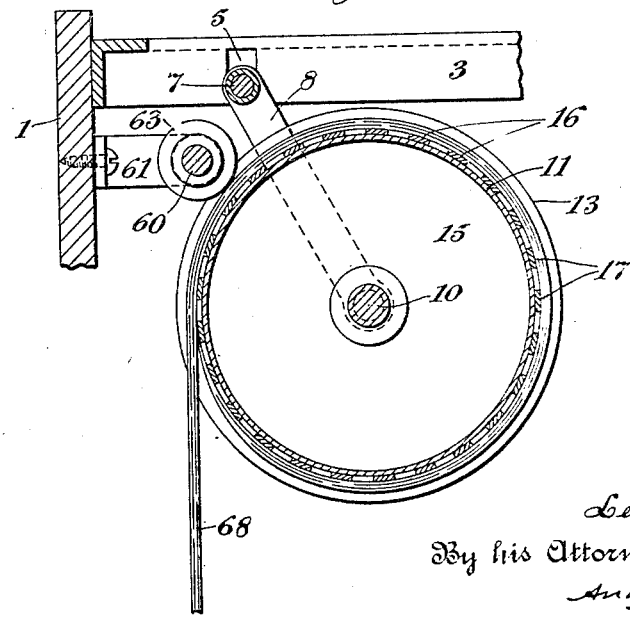

In the drawings, Fig. 1 is a front view of my improved apparatus; Fig. 2 is a back view of the same, with the back of the case removed, and with medial portions broken away so as to condense the figure; Fig. 3 is a top view, with the top of the case removed, and also shortened by the omission of a medial part, the rear base extension being also broken away; Fig. 4 is a side view, with the side of the case removed, taken as looking to the left on Fig. 2; Figs. 2, 3 and 4 are on an enlarged scale as compared to Fig. 1; Fig. 5 is a detail taken from in front of the back support for the placard ends; Fig. 6 is a view of the same taken as looking to the left on Fig. 2; Fig. 7 is a longitudinal sectional view of the placard carrier and its supporting and driving mechanism, the figure being shortened by the omission of a medial portion; Fig. 8 is an end view taken on the line 8—8 of Fig. 7, looking to the right, of the placard carrier rotating means; Fig. 9 is a cross sectional view of the placard carrier taken as on the line 9—9 of Fig. 7, looking to the right; Fig. 10 is an elevation of the bottom of the motor showing its speed governor, partly in section; Fig. 11 is a bottom view of the same; Fig. 12 is a longitudinal sectional detail illustrating the supporting and connecting means for the placard-lifting roll; Fig. 13 is a detail of the placard-lifting roll shaft, taken as looking down on Fig. 12; and Fig. 14 is a vertical sectional view taken on the line 14—14 of Fig. 12, looking to the left.

Similar parts are designated by corresponding reference numerals in all the figures.

The apparatus is assembled in a suitable case 1, provided with an open or glazed front 2, and also provided with suitable supports as 3, 4, in its ends for detachably receiving and carrying the placard carrier.

In recesses 5, 6, in the supports 3 and 4, rest the ends of a rod 7, upon which are hung two arms 8, 9, in the opposite ends of which are journalled the ends of a shaft 10, upon which is mounted a placard carrier which embodies a drum element 11 held between flanged edges 12, 13, overlapping disks 14, 15, a series of sockets 16, 16 being formed in the outer edges of the disks 14, 15, overlapped by the flanged edges of the disks 12, 13, so as to form pockets into which the ends of flexible strips 17, 17, may be sprung.

By folding the ends of the placards around the strips 17, 17, and then springing the ends of the strips into place in the retaining pockets, the placard may be attached to the carrier, being held in place against springing outward by the confining effect of the roll of placards which is maintained around the carrier during operation. It will be seen, therefore, that the placard carrier with its placards can be lifted bodily out of the top of the machine by raising the rod 7 out of its bearings in the framework. This greatly facilitates the attachment and detachment of the placards; and even makes it practicable to insert a new placard carrier with placards entire, if that is desirable in the practical operation of the apparatus.

A pawl 20 is hung on the rod 7, its free end engaging the ratchet teeth 21, 21, on the circumference of the disk 12; and secured to the arm 9, preferably adjustably, as by bolts 22, 23, passing through the arm, is an extension 24, preferably provided with an adjustment slot 25 registering with the bolt 22; and also provided at its free end with a roller 26 which travels against a cam 27 mounted on a shaft 28 carried in an eccentric bearing 31 adjustably secured, as by a locking nut 32, in the end casing of the apparatus.

By turning the bushing, the position of the shaft 28 and eccentric 27 can be slightly changed relative to the shaft 10, so as to give considerable nicety of adjustment for the placard carrier. This permits the making of allowance for variations in the thickness and number of the placards, and the like, in the practical operation of the apparatus.

A gravity, detent pawl 34 is also pivoted in the casing of the apparatus and engages with the teeth 21, 21 on the disk 12.

A gear wheel 35 is mounted on the shaft 28, meshing with a pinion 36 turning on a shaft 37 fastened in the end frame of the apparatus, the pinion 36 being attached to a worm gear 38 meshing with a worm 39 on a shaft 40 driven by an electric motor 41. On the lower end of the casing of the motor is threaded a disk 42 having an annular groove as 43 therein in which is inserted a washer 44 bearing against a spring disk 45 attached to the end of the shank 40, and provided with depending weights 46, 46, which will tend to fly outward, by centrifugal force, when the shank 40 is rotated and to dish the disk 45 toward the washer 44 more or less strongly according to the rapidity of the rotation of the shank 40. The periphery of the disk 42 is notched; and a spring detent 47 attached by one end to the motor casing, engages with its free end in the notches 48, 48 of the disk 42; so as to lock the disk 42 in the selected position to which it may be adjusted by screwing it up or down on its support. This arrangement permits of the accurate adjustment of the motor governing means so that it may be arranged to maintain a uniform, even, drive of the mechanism by the motor.

A worm gear 50 meshes with the worm 39, being carried on a shaft 51 passing through an adjustable bearing 52 in the end frame of the apparatus, the bearing being eccentrically bored; so that by turning the bearing the position of the shaft 51 may be slightly altered, to permit the take up of wear between the worm and the worm gear and to make other niceties of adjustment, the bearing being locked in a selected position by means of a nut 53 which is threaded upon it.

On the inner end of the shaft 51 is secured, as by a set screw 54, a sleeve 55, which is provided with a transverse pin 56. A shaft 60 in a bearing 61, has one end inserted in the sleeve 55, being provided with a slot 62 to straddle the pin 56. This arrangement permits a certain amount of flexibility of adjustment between the shafts 51 and 60.

On the shaft 60 are mounted, preferably, two lifting rollers 63, 63, which are made of soft rubber or such other suitable material as will adapt them for engaging with and lifting a placard without marring it. When the rear placard is in contact with these rollers, if they are rotated, they may be made to lift and push the placard upward, relative to the carrier, as will be hereafter further explained.

Mounted in the framework of the apparatus is a placard support 65 provided with a transverse member 66 carrying blocks 67, 67 of rubber or similar material, against which the ends of the group of placards 68 rest, being held against the support by their own weight, as the engaging elements 67, 67 are projected forward beyond the perpendicular line of the placards by the support 65.

Suitable illuminating means, as the lamps 70, 70 may be mounted in the apparatus and connected in circuit with the motor 41 if that is desirable.

The operation of my apparatus is as follows.

The placards are first mounted upon the carrier, as above explained, by folding their ends around the strips 17 and then springing the ends of the strips into the sockets in the heads of the carrier, each successive sheet serving to hold down the strip behind it from springing out of position, and the roll of sheets, when mounted, effectually serving to prevent the dislodgment of any of the strips 17. This greatly facilitates the attachment and detachment of the placards as changes may be desired.

When the placards have been thus arranged on the carrier and the carrier properly positioned in its bearings, the ends of the placard will hang down past the support 66, swinging back thereagainst. On starting the motor 41 its worm 39, through worm gear 38, pinion 36 and gear 35 will rotate the shaft 28 and the cam 27 at such a rate of speed as may be predetermined by the adjustment of the motor governor above described.

The rotation of the cam 27 causes the placard carrier to be dropped back and then raised again once during each revolution of the cam 27, through the agency of the roller 26 on extension 24 attached to the arm 9. During this upward swing of the carrier the detent 34 holds the ratchet disk 12 against rotation, with the consequence that the upper edge of the disk will be thrown forward relative to the pawl 20 a distance controlled by the extent of the swing of the carrier. If the adjustment is so made that that swing will allow one tooth of the ratchet disk 12 to pass the pawl 20, the lowering of the carrier, when the depression in the cam 27 next reaches the roller 26, will result in rotating the carrier the distance of one tooth, in a clockwise direction, as looked at in Fig. 8. This rotation of the carrier causes the free end of the rearmost placard to be raised clear of the engaging elements 67 on the transverse bar 66 of the support 65, while the end of the next to the last placard rests against the supporting elements 67 and is pressed toward them by the weight of the other placards in front of it, the nature of the support 67 causing the material of the placard to cling somewhat thereto. The rearward swing of the placard carrier causes the rearmost placard to be pressed against the lifting roller 63, 63, which are being driven in an anti-clockwise direction, as looked at in Fig. 8, through the medium of the shafts 60, 51, worm gear 50 and worm 39. The rollers 63, 63, therefore, will draw up and push forward the rearmost placard causing it to gradually fall forward over the placard carrier to such an extent that when the placard carrier is next swung forward by the cam 27, so as to release the placard from pressure against the roller 63, 63, the placard will unroll of its own weight and fall forward dropping its free end into view position, in which position it will remain while the roll 26 is traversing the raised portion of the cam 27. During this throwing forward of the placard, the placard preceding it will be held by the clinging action of the support 67, 67, sufficiently to prevent its being drawn up by the friction of the rising placard against it. For it will be seen that when the end of the rearmost placard is raised above the support 67, 67, that placard will naturally swing back somewhat so as to open a space between it and the next preceding one and to allow them to practically hang clear of each other up to the carrier. These movements will be repeated with each revolution of the cam 27, the placards attached to the carrier being thus exhibited, one by one, and successively remaining stationary and exposed to view a length of time governed by the speed of the cam 27.

By means of my improvements I obtain a compact, simple and efficient apparatus for displaying long-sheet placards, which is particularly adapted to the ready attachment and detachment of the placards; the removal of the placard carrier and placards as a unit; the adjustment of the operating parts to accommodate them to modified conditions caused by changes in the number or thickness of the placards and the wear of the parts; and also being provided with efficient, automatic speed governing means of simple construction so that the apparatus may be arranged to run at such a uniform speed as may be found most desirable for the satisfactory display of the placards.

I desire it to be understood that the details of construction of my mechanism may be modified, as by the substitution of mechanical equivalents, without departing from the spirit and scope of my invention as claimed, the particular forms of mechanism for accomplishing the results aimed at being intended as illustrative types and not as exclusive embodiments of my improvements.

Having thus described my invention, what I claim and desire to secure by Letters Patent of the United States is:—

1. In a display apparatus, the combination of placard carrier rotating means and a rotatable placard carrier, a series of flexible placards each attached by one end thereto and partially rolled thereupon with their free ends depending therefrom, and means for frictionally engaging the back of and lifting the depending portion of the placard.

2. In a display apparatus, the combination of placard carrier rotating means and a rotatable placard carrier, a series of flexible placards each attached by one end thereto and partially rolled thereupon with their free ends depending therefrom, and means for frictionally engaging the back of and lifting the depending portions of the placards, successively.

3. In a display apparatus, the combination of placard carrier rotating means and a rotatable placard carrier, a series of flexible placards each attached by one end thereto and partially rolled thereupon with their free ends depending therefrom, and rotatable means for frictionally engaging the back of and lifting the depending portion of a placard.

4. In a display apparatus, the combination of placard carrier rotating means and a rotatable placard carrier, a series of flexible placards each attached by one end thereto and partially rolled thereupon with their free ends depending therefrom, and means for frictionally engaging the back of and lifting the depending portion of a placard sufficiently to cause the placard to be drawn forward over the carrier by its own weight.

5. In a display apparatus, the combination of placard carrier rotating means, moveable carrier supports, and a rotatable placard carrier, a series of flexible placards each attached by one end thereto and partially rolled thereupon with their free ends depending therefrom, means for frictionally engaging the back of and lifting the depending portion of a placard, and means for moving the carrier supports and the carrier to bring a placard into operative engagement with the lifting means.

6. In a display apparatus, the combination of placard carrier rotating means, swinging carrier supports, means for swinging the supports, and a rotatable placard carrier, a series of flexible placards each attached by one end thereto and partially rolled thereupon with their free ends depending therefrom, means for frictionally engaging the back of and lifting the depending portion of a placard, and means for swinging the carrier supports and the carrier to bring a placard into operative engagement with the lifting means.

7. In a display apparatus, the combination of placard carrier rotating means and a rotatable placard carrier, a series of flexible placards each attached by one end thereto and partially rolled thereupon with their free ends depending therefrom, means for frictionally engaging the back of and lifting the depending portion of a placard, and means for periodically moving the placard carried toward and away from the lifting means to bring a placard into operative engagement with the lifting means.

8. In a display apparatus, the combination of placard carrier rotating means and a rotatable placard carrier, a series of flexible placards each attached by one end thereto and partially rolled thereupon with their free ends depending therefrom, and periodically cooperating means for frictionally engaging the back of and lifting the depending portion of a placard.

9. In a display apparatus, the combination of placard carrier rotating means and a rotatable placard carrier, a series of flexible placards each attached by one end thereto and partially rolled thereupon with their free ends depending therefrom, means for frictionally engaging the back of and lifting the depending portion of a placard, means for periodically moving the placard carrier toward and away from the lifting means, and means for causing such movement of the carrier to rotate it step by step.

10. In a display apparatus, the combination of placard carrier rotating means and a rotatable placard carrier, a series of flexible placards each attached by one end thereto and partially rolled thereupon with their free ends depending therefrom, means for frictionally engaging the back of and lifting the depending portion of a placard, and means, embodying cam rotating means and a cam and means actuated by the cam, for periodically moving the placard carrier away from and allowing it to return toward the lifting means to bring the placards successively into contact with the lifting means.

11. In a display apparatus, the combination of placard carrier rotating means, swinging carrier supports, means, embodying cam moving means and a governing cam, connecting means between the cam and said supports for swinging such supports, and a rotatable placard carrier, a series of flexible placards each attached by one end thereto and partially rolled thereupon with their free ends depending therefrom, and means for frictionally engaging the back of and lifting the depending portion of a placard, swinging the supports serving to bring a placard into engagement with the lifting means.

12. In a display apparatus, the combination of placard carrier rotating means, swinging carrier supports, means, embodying a governing cam and adjustable intermediate means, for swinging such supports, and a rotatable placard carrier, a series of flexible placards each attached by one end thereto and partially rolled thereupon with their free ends depending therefrom, and means for frictionally engaging the back of and lifting the depending portion of a placard, swinging the supports serving to bring a placard into engagement with the lifting means.

13. In a display apparatus, the combination of placard carrier rotating means and a rotatable placard carrier, a series of flexible placards each attached by one end thereto and partially rolled thereupon with their free ends depending therefrom, and rotatable means, embodying a clinging-faced roller, for frictionally engaging the back of and lifting the depending portion of a placard.

14. In a display apparatus, the combination of placard carrier rotating means and a rotatable placard carrier, a series of flexible placards each attached by one end thereto and partially rolled thereupon with their free ends depending therefrom, and rotatable means, embodying a positively driven clinging-faced roller, for frictionally engaging the back of and lifting the depending portion of a placard.

15. In a display apparatus, the combination of placard carrier rotating means and a rotatable placard carrier, a series of flexible placards each attached by one end thereto and partially rolled thereupon with their free ends depending therefrom, and rotatable means, embodying adjustable connecting means and a clinging-faced roller, for frictionally engaging the back of and lifting the depending portion of a placard.

16. In a display apparatus, the combination of placard carrier rotating means and a rotatable placard carrier, a series of flexible placards each attached by one end thereto and partially rolled thereupon with their free ends depending therefrom, a back support for such free ends provided with clinging elements, means for periodically raising the free end of the rearmost placard free from such clinging elements, and means for frictionally engaging the back of and lifting the depending portion of a placard.

17. In a display apparatus, the combination of placard carrier rotating means and a rotatable placard carrier, a series of flexible placards each attached by one end thereto and partially rolled thereupon with their free ends depending therefrom, a back support for such free ends provided with clinging elements, means for periodically raising the free end of the rearmost placard free from such clinging elements, and means for frictionally engaging the back of and lifting the depending portion of a placard after it has been freed from the clinging elements.

18. In a display apparatus, the combination with supporting means and carrier rotating means, of a readily detachable unit embracing a placard carrier and movable supporting means therefor adapted to retain it in operative relation to the rotating means.

19. In a display apparatus, the combination with supporting means and carrier rotating means, of a readily detachable unit embracing a placard carrier and swinging supporting means therefor adapted to maintain it in operative relation to the rotating means.

20. In a display apparatus, the combination with supporting means and carrier rotating means, of a readily detachable unit embracing a transverse rod, swinging arms attached thereto, and a placard carrier journalled between said arms, which are adapted to maintain it in operative relation to the rotating means.

LESLIE R. McDONALD.